United States Patent [19]

Baumbach

[11] 4,233,552

[45] Nov. 11, 1980

[54] VEHICLE-STARTING CIRCUIT WITH EXCESSIVE VOLTAGE DETECTION

[75] Inventor: Dale M. Baumbach, Sugar Land, Tex.

[73] Assignee: Associated Equipment Corporation, St. Louis, Mo.

[21] Appl. No.: 920,003

[22] Filed: Jun. 28, 1978

[51] Int. Cl.[3] .......... H02J 7/00

[52] U.S. Cl. .......... 320/7; 320/16; 320/25

[58] Field of Search .......... 320/6, 7, 15, 16, 25

[56] References Cited

U.S. PATENT DOCUMENTS

| | | | |
|---|---|---|---|
| 3,029,301 | 4/1962 | Strider | 320/7 X |
| 3,343,057 | 9/1967 | Smith | 320/25 X |
| 3,590,357 | 6/1971 | Reid | 320/7 |
| 3,654,538 | 4/1972 | Gardberg | 320/7 |
| 3,763,415 | 10/1973 | Ownby | 320/16 X |
| 3,949,289 | 4/1976 | Day | 320/15 X |

*Primary Examiner*—Robert J. Hickey

*Attorney, Agent, or Firm*—Cohn, Powell & Hind

[57] ABSTRACT

A vehicle-starting circuit with excessive voltage detection in which a battery switch assembly including a first battery switch normally connecting the starting batteries in parallel, and a second battery switch operatively connecting or disconnecting the starting batteries to the stalled vehicle battery. A first control is provided for actuating the second battery switch, and is connected to the second battery switch for connecting the starting batteries in parallel to the stalled vehicle battery. A second control is connected to the first battery switch for actuating the first battery switch to one position for series connection when the second control is "on" and for allowing the first battery switch to return to normal position for parallel connection when the second control is "off." A voltage-detector is connected to the starting batteries and to the second control for turning the second control "off" if actuated. The first control includes a first control switch connected to the stalled vehicle battery, and a first transistor assembly connected to the second battery switch for connecting the starting batteries to the stalled vehicle battery. The second control includes a second control switch connected to the stalled vehicle battery, and a second transistor assembly connected to the first battery switch for connecting the starting batteries selectively in series. The trigger includes an SCR activated in response to the reference voltage, and a third transistor assembly connected to the SCR and to the second control switch for conditioning the second control switch upon activation of the SCR to connect the starting batteries in parallel. A trickle charge circuit connects the starting batteries to the stalled vehicle battery through the outlet for supplying a limited current.

8 Claims, 1 Drawing Figure

VEHICLE-STARTING CIRCUIT WITH EXCESSIVE VOLTAGE DETECTION

BACKGROUND OF THE INVENTION

This invention relates generally to a vehicle-starting circuit utilizing two starting batteries, and more particularly, to an improvement in this circuit for detection of excessive voltage.

In a vehicle-starting circuit in which two starting batteries are used, the batteries, being nominal 12 volt batteries, are normally connected in parallel and are used to connect and start a stalled vehicle 12 volt battery. Under normal operating conditions, the two 12 volt batteries in parallel provide a 12 volt power source. If the load is so great that this 12 volt power source is insufficient to turn the engine of the stalled vehicle fast enough to start the engine, the two 12 volt batteries are then placed in series, thereby providing a nominal 24 volt power source. This power is usually sufficient to start the stalled vehicle engine. However, if the load created by the stalled vehicle engine is not sufficient so as to require a 24 volt power source, and if the two 12 volt batteries are placed in series to provide the 24 volt power source anyway, excessive voltage and current applied to the stalled vehicle could cause severe damage.

SUMMARY OF THE INVENTION

The present vehicle-starting circuit includes a voltage detector which will automatically switch the two 12 volt batteries out of series relation and back into parallel relation when excessive voltage is applied at the stalled vehicle. This voltage detector switches from the high voltage to the normal lower voltage quickly so that an unloaded started motor is not turned too fast. More particularly, the voltage detector switches so that the voltage at the stalled vehicle will not exceed a predetermined value, as for example, 14–15 volts, in the high voltage output condition of the circuit.

The vehicle-starting circuit includes a battery switch means including a first battery switch means normally connecting the starting batteries in parallel, and a second battery switch means operatively connecting or disconnecting the starting batteries to the stalled vehicle battery. A first control means is provided for actuating the second battery switch means, and is connected to the second battery switch means for connecting the starting batteries in parallel to the stalled vehicle battery. A second control means is connected to the first battery switch means for actuating the first battery switch means to one position for series connection when the second control means is "on" and for allowing the first battery switch means to return to normal position for parallel connection when the second control means is "off." A voltage detecting means is connected to the starting batteries and to the second control means for turning the second control "off" if actuated.

More particularly, the first control means includes a first control switch means connected to the stalled vehicle battery, and a first transistor means connected to the second battery switch means for connecting the starting batteries to the stalled vehicle battery.

More particularly, the second control means includes a second control switch means connected to the stalled vehicle battery and a second transistor means connected to the first battery switch means for connecting the starting batteries selectively in series.

The voltage-detecting means includes a voltage-selecting means connected to the second control switch means for determining the reference voltage, and a trigger means connected to the voltage-selecting means and to the second control switch means for conditioning the second control switch means to be in "off" condition.

More particularly, the voltage-selecting means is a potentiometer, and the trigger means includes an SCR connected to the potentiometer and activated in response to the reference voltage, and a transistor means connected to the SCR for conditioning the second control switch means upon activation of the SCR to connect the starting batteries in parallel.

The vehicle-starting circuit includes a trickle charge means connecting the starting batteries to the stalled vehicle battery for supplying a limited current.

DESCRIPTION OF THE PREFERRED EMBODIMENT

Figure 1:
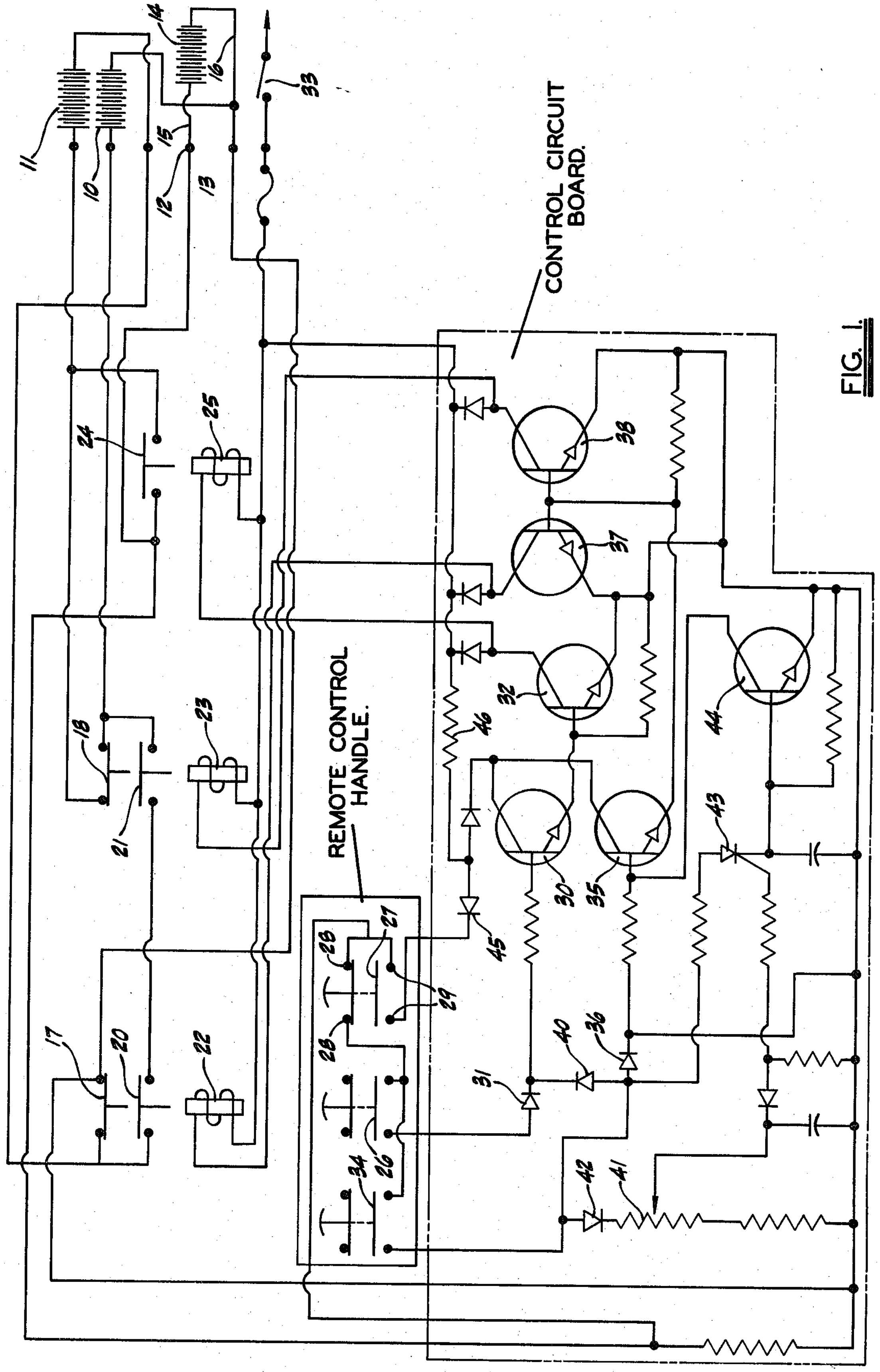
FIG. 1 is a circuit diagram of the vehicle-starting circuit.

Referring now by characters of reference to the drawing, it will be understood that starting batteries 10 and 11, constituting the power source, are normally maintained in parallel and are selectively placed in series.

The output means operatively connected to the starting batteries 10–11 includes a positive outlet terminal 12 and a negative output terminal 13. These output terminals 12–13 are connected to a stalled vehicle battery 14 by suitable battery cables and clamps represented by 15 and 16.

A battery switch means includes a first battery switch means consisting of closed switches 17 and 18 connecting the starting batteries 10–11 in parallel, and of switches 20 and 21. Associated relay coils 22 and 23 operate to open the switches 17 and 18 and close the switches 20 and 21 to connect the batteries 10–11 selectively in series. The starting batteries 10–11 are nominal 12 volt batteries which when connected in parallel provide a nominal 12 volt power source and when connected in series provide a nominal 24 volt power source.

The battery switch means also includes a second battery switch means having a normally opened switch 24 actuated by relay coil 25. The second battery switch 24 operatively connects or disconnects the starting batteries 10–11 to the output terminals 12–13.

A first control means actuates the battery switch means and is connected to the second battery switch means for connecting the starting batteries 10–11 in parallel to the output terminals 12–13. The first control means includes a first control switch 26 that is normally open and is connected to the stalled vehicle battery 14 through a trickle charge switch 27 normally closed across terminals 28, the purpose and function of the trickle charge switch 27 being later described upon more detailed description of the circuit.

The first control means also includes a first transistor means connected to the first control switch 26 and to the second battery switch means 24–25 for connecting the starting batteries 10–11 in parallel to the output terminals 12–13. The first transistor means includes a first transistor 30 having its base connected to the first control switch 26 through a diode 31. The base of a second transistor 32 is connected to the emitter of transistor 30. The collector of transistor 32 is connected to the relay coil 25 of the second battery switch means, and thence to the ignition switch 33.

When the first control switch 26 is closed, the transistor 30 is energized through diode 31 by the voltage of the stalled vehicle battery 14. When the transistor 30 is energized, the transistor 32 is also energized. The energization of relay coil 25 closes the second battery switch 24 to place the starting batteries 10–11 in parallel across the output terminals 12–13.

A second control means actuates the battery switch means for selectively connecting the starting batteries in series with the output terminals 12–13. The second control means includes a second control switch, which is normally open, and which is connected to the stalled vehicle battery 14 through the normally closed trickle charge switch 27. The second control switch 34 is connected to the battery switch means by a second transistor means for connecting the starting batteries 10–11 selectively in series. The second transistor means includes a first transistor 35, the base of which is connected to the second control switch 34 through a diode 36. The emitter of transistor 35 is connected to the bases of second and third transistors 37 and 38. The collector of transistor 37 is connected to the relay coil 22, while the collector of transistor 38 is connected to the relay coil 23.

If the stalled vehicle starter motor is not turning fast enough to start the stalled vehicle engine, and more power is required, the second control switch 34 is closed so as to enable diode 36 to activate transistor 35. When the transistor 35 is activated, transistors 37 and 38 are also energized. When the transistor 37 is energized, the relay coil 22 opens the battery switch 17 and closes the battery switch 20, and when the transistor 38 is energized, the relay coil 23 opens the battery switch 18 and closes the battery switch 21, thereby placing the starting batteries 10–11 selectively in series. The transistors 30 and 32 are still energized, but now through a diode 40, and accordingly, the relay coil 25 continues to hold the second battery switch 24 closed so that the two 12 volt starting batteries 10–11 are placed in series across the output terminals 12–13.

A voltage-detecting means is connected to the second control means for conditioning the second control means to be in "off" condition. The voltage-detecting means includes a voltage-selecting means such as a potentiometer 41 connected to the second control switch 34 through a diode 42. The potentiometer 41 selectively determines the reference voltage.

The voltage-detecting means also includes a trigger means having a SCR 43 that is activated in response to the reference voltage. The trigger means also has a third transistor means connected to the SCR 43 and to the second control switch means for conditioning the second control switch means upon activation of the SCR 43 to connect the starting batteries 10–11 in parallel. The third transistor means includes a transistor 44, the base of which is connected to the SCR 43, the emitter of which is connected to the emitters of transistors 37 and 38, and the collector of which is connected to the base of transistor 35.

When the voltage at the output clamps that are connectable to the stalled vehicle battery 14 reaches a predetermined voltage, i.e., 15 volts, as determined by the setting of potentiometer 41, the SCR 43 is enabled so as to energize the transistor 44. When the transistor 44 is energized, the transistor 35 is de-energized, and consequently, the transistors 37 and 38 are de-energized also. When the transistors 37 and 38 are de-energized, the relay coils 22 and 23 respectively are de-energized, thereby allowing battery switches 20 and 21 to open and closing battery switches 17 and 18, and thereby placing the two 12 volt starting batteries 10–11 in parallel. It will be understood that the second battery switch 24 is maintained closed by its relay coil 25 because transistors 30 and 32 remain energized.

If the stalled vehicle battery voltage is lower than a positive 2.5 volts for example, neither the first control switch 26 nor the second control switch 34 will operate through the circuit to close the battery switches 20, 21 and 24 to energize the output terminals 12–13. However, if the polarity connection is correct, and the trickle charge switch 27 is selectively closed across terminals 29, a trickle charge means connected to the starting batteries 10–11 and to the outlet terminals 12–13 will supply a limited current to raise the voltage of the stalled vehicle battery 14 enough for the "parallel" and "series" charging functions to operate.

For a trickle charge, the correct polarity of connection at the output cables 15–16 is sensed by diode 45; for normal 12 volt output the correct polarity is sensed by diode 31, and for high 24 volt output the correct polarity is sensed by diodes 36 and 40.

The minimum voltage required to make the normal 12 volt output circuit function is established by the inherent internal fixed voltage drops of diode 31, and transistors 30 and 32.

In a similar manner, the minimum stalled vehicle voltage required to make the high 24 volt output circuit function is established by the inherent internal fixed voltage drops of primarily diode 40 and transistors 30 and 32, and of primarily diode 35 and transistors 35, 37 and 38.

The trickle charge means includes a current-limiting resistor 46, that is chosen to limit current into a shorted output to approximately one amp, a diode 45, and the trickle charge switch 27.

It will be understood that when the trickle charge switch 27 is moved to open the terminals 28 and to close the terminals 29, the trickle charge means is closed through the diode 45 and resistor 46, while the circuit to the first and second control switches 26 and 34 is opened.

It is thought that the operation of the vehicle-starting circuit is apparent from the foregoing detailed description, but for completeness of disclosure the sequence of operation with the excessive voltage detection will be briefly described.

The first control switch 26 is closed so as to energize the transistors 30 and 32 through the diode 31, thereby causing the relay coil 25 to close the second battery switch 24, thereby placing the starting batteries 10–11 in parallel through closed battery switches 17 and 18 across the output terminals 12–13.

If the stalled vehicle starter motor is not turned fast enough to start the stalled vehicle engine, the second control switch 34 is closed to energize the transistors 35, 37 and 38 through the diode 36. The transistors 30 and 32 remain energized through diode 40 to maintain the second battery switch 24 closed. When the transistors 37 and 38 are energized, the battery switches 17 and 18 are opened and battery switches 20 and 21 are closed, thereby placing the starting batteries 10–11 selectively in series across the output terminals 12–13.

If excessive voltage is obtained at the output clamps as determined by the reference voltage of potentiometer 41, the SCR 43 is enabled so as to energize transistor 44, thereby de-energizing transistors 35, 37 and 38. Again, it will be understood that transistors 30 and 32 remain energized through diode 40 so as to maintain the second battery switch 24 closed. However, when the transistors 37 and 38 are deenergized, the battery switches 20 and 21 are opened and battery switches 17 and 18 are again closed to place the starting batteries 10–11 in parallel across the output terminals 12–13.

I claim as my invention:

1. A vehicle-starting circuit with excessive voltage detection, comprising:

(a) a pair of starting batteries, and a stalled vehicle battery,
(b) a battery switch means including:
   1. a first battery switch means normally connecting the starting batteries in parallel, and
   2. a second battery switch means operatively connecting or disconnecting the starting batteries to the stalled vehicle battery,
(c) a first control means for actuating the second battery switch means, and connected to the second battery switch means for connecting the starting batteries in parallel to the stalled vehicle battery,
(d) a second control means connected to the first battery switch means for actuating the first battery switch means to one position for series connection when the second control means is "on" and for allowing the first battery switch means to return to normal position for parallel connection when the second control means is "off," and
(e) voltage-detecting means connected to the starting batteries and the second control means for turning the second control means "off," if actuated.

2. A vehicle-starting circuit with excessive voltage detection, comprising:

(a) a pair of starting batteries, and a stalled vehicle battery,
(b) a battery switch means including:
   1. a first battery switch means normally connecting the starting batteries in parallel, and
   2. a second battery switch means operatively connecting or disconnecting the starting batteries to the stalled vehicle battery,
(c) a first control means for actuating the second battery switch means, and connected to the second battery switch means for connecting the starting batteries in parallel to the stalled vehicle battery,
(d) a second control means connected to the first battery switch means for actuating the first battery switch means to one position for series connection when the second control means is "on" and for allowing the first battery switch means to return to normal position for parallel connection when the second control means is "off,"
(e) voltage-detecting means connected to the starting batteries and the second control means for turning the second control means "off" if actuated, and
(f) the voltage-detecting means including:
   1. a voltage-selecting means connected to the second control switch means for determining the reference voltage, and
   2. a trigger means connected to the voltage-selecting means and to the second control switch means for conditioning the second control switch means to be in "off" condition.

3. A vehicle-starting circuit with excessive voltage detection, as defined in claim 2, in which:

(g) the voltage-selecting means is a potentiometer.

4. A vehicle-starting circuit with excessive voltage detection, as defined in claim 2, in which:

(g) the trigger means includes:
   (1) an SCR activated in response to the reference voltage, and
   (2) a third transistor means connected to the SCR and to the second control switch means for conditioning the second control switch means upon activation of the SCR to connect the starting batteries in parallel.

5. A vehicle-starting circuit with excessive voltage detection, as defined in claim 2, in which:

(g) the voltage-selecting means is a potentiometer, and
(h) the trigger means includes:
   (1) an SCR connected to the potentiometer and activated in response to the reference voltage, and
   (2) a transistor means connected to the SCR for conditioning the second control switch means upon activation of the SCR to connect the starting batteries in parallel.

6. A vehicle-starting circuit with excessive voltage detection, comprising:

(a) a pair of starting batteries, and a stalled vehicle battery,
(b) a battery switch means including:
   1. a first battery switch means normally connecting the starting batteries in parallel, and
   2. a second battery switch means operatively connecting or disconnecting the starting batteries to the stalled vehicle battery,
(c) a first control means for actuating the second battery switch means, and connected to the second battery switch means for connecting the starting batteries in parallel to the stalled vehicle battery,
(d) a second control means connected to the first battery switch means for actuating the first battery switch means to one position for series connection when the second control means is "on" and for allowing the first battery switch means to return to normal position for parallel connection when the second control means is "off,"
(e) voltage-detecting means connected to the starting batteries and the second control means for turning the second control means "off" if actuated,
(f) the first control means including:
   1. a first control switch means connected to the stalled vehicle battery, and
   2. a first transistor means connected to the second battery switch means for connecting the starting batteries to the stalled vehicle battery,
(g) the second control means including:
   1. a second control switch means connected to the stalled vehicle battery, and
   2. a second transistor means connected to the first battery switch means for actuating the first battery switch means to connect the batteries in series if "on," and allows the first battery switch means to return to normal position for parallel connection if "off," and
(h) the voltage-detecting means including:

1. a voltage-selecting means connected to the second control switch means for determining the reference voltage, and
2. a trigger means connected to the voltage-selecting means and to the second transistor means for conditioning the second transistor means to be in "off" condition.

7. A vehicle-starting circuit with excessive voltage detection, as defined in claim 6, in which:

(i) the trigger means includes:

1. an SCR activated in response to the reference voltage, and
2. a third transistor connected to the SCR and to the second transistor means for conditioning the second transistor means upon activation of the SCR to connect the starting batteries in parallel by the first transistor means.

8. A vehicle-starting circuit with excessive voltage detection, comprising:

(a) a pair of starting batteries, and a stalled vehicle battery, (b) a battery switch means including:

1. a first battery switch means normally connecting the starting batteries in parallel, and
2. a second battery switch means operatively connecting or disconnecting the starting batteries to the stalled vehicle battery, (c) a first control means actuating the second battery switch means, and connected to the second battery switch means for connecting the starting batteries in parallel to the stalled vehicle battery, (d) a second control means connected to the first battery switch means for actuating the first battery switch means to one position for series connection when the second control means is "on" and for allowing the first battery switch means to return to normal position for parallel connection when the second control means is "off,"

(e) voltage detecting means connected to the starting batteries and the second control means for turning the second control means "off" if actuated, (f) outlet means is connected to the starting batteries and to the stalled vehicle battery, and (g) a trickle charge means is connected to the starting batteries and to the stalled vehicle battery for supplying a limited current.

* * * * *

UNITED STATES PATENT AND TRADEMARK OFFICE

CERTIFICATE OF CORRECTION

PATENT NO. : 4,233,552

DATED : November 11, 1980

INVENTOR(S) : Dale M. Baumbach

It is certified that error appears in the above-identified patent and that said Letters Patent are hereby corrected as shown below:

Column 6, line 11, delete the word "third".

Signed and Sealed this

*Third* Day of *March 1981*

[SEAL]

*Attest:*

RENE D. TEGTMEYER

*Attesting Officer* *Acting Commissioner of Patents and Trademarks*